United States Patent [19]

Hoheisel et al.

[11] 3,873,503
[45] Mar. 25, 1975

[54] PROCESS FOR THE PREPARATION OF A POLYAMIDE

[75] Inventors: Klaus Hoheisel, Wiesbaden-Biebrich; Gisela Jenik, Bensheim; Walter Seifried, Wiesbaden-Biebrich, all of Germany

[73] Assignee: Kalle Aktiengesellschaft, Wiesbaden, Germany

[22] Filed: Mar. 29, 1974

[21] Appl. No.: 456,364

Related U.S. Application Data

[63] Continuation-in-part of Ser. No. 46,794, June 16, 1970, abandoned, which is a continuation-in-part of Ser. No. 774,515, Nov. 8, 1968, abandoned.

[52] U.S. Cl. ............ 260/47 CB, 260/49, 260/63 N, 260/77.5 R, 260/78 TF
[51] Int. Cl. .............................................. C08g 20/32
[58] Field of Search ....... 260/47 CB, 77.5 R, 78 TF, 260/49, 63 N

[56] References Cited
UNITED STATES PATENTS
3,551,383  12/1970  Fang ..................................... 260/47

FOREIGN PATENTS OR APPLICATIONS
42,676  1/1967  Japan .............................. 260/47 CB
42,677  1/1967  Japan .............................. 260/47 CB

*Primary Examiner*—Lester L. Lee
*Attorney, Agent, or Firm*—James E. Bryan

[57] ABSTRACT

This invention relates to a process for the preparation of polyamides having the general formula

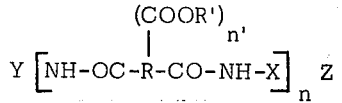

in which at least one -COOR' group is in $\beta$ or $\gamma$ position to an adjacent —CO— group, by reacting in an inert solvent at least one organic diisocyanate having the formula

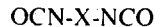

with at least one dicarboxylic acid having the formula

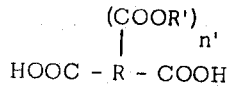

in which at least one -COOR' group is in $\beta$ or $\gamma$ position to an adjacent —COOH group, and in the above formulae Y is selected from the group consisting of

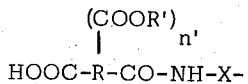

or OCN-X-, Z is selected from the group consisting of

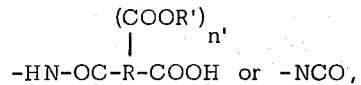

X is selected from the group consisting of an aromatic or aliphatic group having 2 to 20 carbon atoms, n is an integer from 10 to 1,000, preferably 50 to 400, n' is the integer 1 or 2, R is a radical derived from a compound selected from the group consisting of benzene, a multi-ring compound, a six- or five-ring heterocyclic compound having 4 to 30 carbon atoms or the compound AR-R''-Ar in which Ar is a radical derived from a compound selected from the group consisting of benzene or naphthalene and R'' is selected from the group consisting of —CO—, —CH$_2$—, —CH—(CH$_3$)—, —C—(CH$_3$)$_2$—, —O—, or —SO$_2$—, and R' is selected from the group consisting of phenyl, an aliphatic, other aromatic, or aliphatic-aromatic group having 3 to 18 carbon atoms, and said groups substituted by at least one nitro, amino, or ether group.

4 Claims, No Drawings

PROCESS FOR THE PREPARATION OF A POLYAMIDE

This application is a continuation-in-part of copending application Ser. No. 46,794, filed June 16, 1970 and now abandoned, which in turn is a continuation-in-part of application Ser. No. 774,515, filed Nov. 8, 1968, now abandoned.

The present invention relates to a process for the production of polyamides. Furthermore the invention relates to the conversion of the polyamides into shaped articles having no imide units or into shaped articles having cyclic imide units.

Particularly in the insulating field, the polyamides and polyimides have increased in importance because of their chemical and thermal resistance. A number of methods for their production and processing into films, coatings, filaments or the like have been described.

According to one known process, the polyamidic acid products are prepared from the soluble reaction products of tetracarboxylic dianhydrides with primary diamines and subsequent conversion into the polyimide form is performed with the action of heat and dehydration means.

Due to the instability of the polyamidic acid, it was found that it is advantageous to replace it in the process by more stable derivatives. It is thus known to convert the polyamidic acid into polyiminolactones or into special metal salts of the polyamidic acid, for example.

For these reasons, these processes involve additional, delicate, difficulty soluble intermediate products and, despite the fact that more stable conditions are achieved, considerably more technical expenditure is required.

According to another known process, the diester dichlorides are prepared from the dianhydrides of the tetracarboxylic acids via the acid diesters as intermediate products and reacted with the diamine in a polycondensation reaction to give the polyamidic esters.

Substantial disadvantages, however, result from the splitting-off of hydrogen chloride, e.g. contamination by by-products produced.

The present invention overcomes the known drawbacks in a process for the production of the polyamides and shaped articles from the polymers and produces pure polymers in a simple manner.

The present invention relates to process for the preparation of polyamides having the general formula

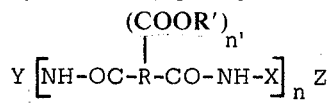

in which at least one —COOR' group is in β or γposition to an adjacent —CO— group, by reacting in an inert solvent at least one organic diisocyanate having the formula

OCN - X - NCO with at least one dicarboxylic acid having the formula

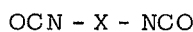

in which at least one -COOR' group is in β or γposition to an adjacent -COOH group, and in the above formulae Y is selected from the group consisting of

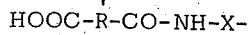

or OCN-X-,

Z is selected from the group consisting of

X is selected from the group consisting of an aromatic or aliphatic group having 2 to 20 carbon atoms, n is an integer from 10 to 1,000, preferably 50 to 400, n' is the integer 1 or 2, R is a radical derived from a compound selected from the group consisting of benzene, a multi-ring compound, a six- or five-ring heterocyclic compound having 4 to 30 carbon atoms or the compound Ar-R''-Ar in which Ar is a radical derived from a compound selected from the group consisting of benzene or naphthalene and R'' is selected from the group consisting of —CO—, —CH$_2$—, —CH—(CH$_3$)—, —C—(CH$_3$)$_2$—, —O—, or —SO$_2$—, and R' is selected from the group consisting of phenyl, an aliphatic, other aromatic, or aliphatic-aromatic group having 3 to 18 carbom atoms, and said groups substituted by at least one nitro, amino, or ether group.

The polyamides can be converted into shaped articles having no imide units at an elevated temperature in the range of about 20° to 200° C., preferably 50° to 150° C., and also can be converted into shaped articles having cyclic imide units at elevated temperatures in the range of about 200° to 1,000° C., preferably 200° to 400° C.

The dicarboxylic acids used in accordance with the invention are acid esters of polycarboxylic acids having a carbalkoxyl or carbaroxyl group at least at one of the carbon atoms in the β- or γ-position to the carboxyl group. According to the present invention, anhydrides of polycarboxylic acids are reacted in inert organic solvents with aliphatic and/or aromatic hydroxy compounds to produce dicarboxylic acids having at least one carbalkoxyl or carbaroxyl group in β- or γ-position. These are then converted at a molar ratio of 1:(1 to 1.3) with diisocyanates, if desired in the presence of catalysts known to isocyanate chemistry and/or at an elevated temperature, to produce linear polyamides. They are obtained, for example, from their anhydrides by the addition of one mole of an aliphatic or aromatic monohydroxy compound per equivalent of carboxylic anhydride, it being immaterial which carbonyl group of the anhydride adds the hydroxy group since isomer mixtures also can be used.

In addition to the dianhydrides of tetracarboxylic acids, monoanhydrides of tricarboxylic acids also may be used in the reaction to produce the dicarboxylic acids of the general formula

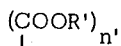

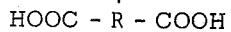

having at least one ester group in β- or γ-position to a COOH-group. They may be used either alone or in admixture to any ratio by weight. Anhydrides suitable for the process are pyromellitic dianhydride, benzophenone-3,3',4,4'-tetracarboxylic dianhydride, naphthalene-1,4,5,8-tetracarboxylic dianhydride, naphthalene-1,4,8-tricarboxylic monoanhydride, and trimellitic monoanhydride.

It also is possible to partially replace the acid ester in the reaction solution by carbalkoxyl-free or carbaroxyl-free aliphatic or aromatic dicarboxylic acids, preferably by isophthalic acid, up to about 30 mole per cent of the dicarboxylic esters.

Exemplary aliphatic and/or aromatic hydroxy compounds are primarily monohydroxy compounds, e.g. phenol. The hydroxy compounds have substituents, e.g. a nitro or amide group, but particularly ether groups, such as an alkoxy group, which have an advantageous effect on the solubility of the dicarboxylic acids and the polymer synthesized therefrom in the inert solvent. The substituted compounds are at least 10 percent more soluble in organic solvents, e.g. anhydrous N,N-dimethyl formamide, dimethyl acetamide, N-methyl pyrrolidone, or dimethylsulfoxide, either alone or in admixture with one another, than are the unsubstituted compounds. Increased solubility results in higher molecular weights, as disclosed on page 84 of "Preparative Methods of Polymer Chemistry," Sorenson and Campbell, Interscience Publishers, Inc., New York, 1961.

Further, films made from unsubstituted compounds have only a certain degree of flexibility and are of high brittleness. They have an elongation at break of only about 5 to 20 percent, whereas the substituted compounds have good flexibility as well as a substantially higher elongation at break of about 50 to 100 percent.

Particularly advantageously used in accordance with the invention are 2-methoxy-ethanol, 2-(2-methoxy-ethoxy) ethanol, 2-[2-(2-methoxy-ethoxy) ethoxy] ethanol, and p-methoxyphenol. Other suitable dicarboxylic acids having at least one ester group in β- or γ-position to an adjacent COOH-group are
4,6-di-(phenylcarboxy)-isophthalic acid
4-(4-methoxy-phenylcarboxy)-isophthalic acid
2,5-di(4-methoxy-phenylcarboxy)-terephthalic acid
2-(4-methoxy-phenylcarboxy)-terephthalic acid
2-(4-phenoxy-phenylcarboxy)-terephthalic acid
2-(2,4,6-trinitro-phenylcarboxy)-terephthalic acid
5,8-di(phenylcarboxy)-1,4-naphthalene dicarboxylic acid
4,8-di(phenylcarboxy)-1,5-naphthalene dicarboxylic acid
5-(4-N,N-dimethylamido-phenylcarboxy)-1,4-naphthalene dicarboxylic acid
5-phenylcarboxy-1,4-naphthalene dicarboxylic acid
4-(2-methoxy-phenylcarboxy)-1,5-naphthalene dicarboxylic acid
3-(3-methoxy-phenylcarboxy)-2,6-naphthalene dicarboxylic acid
2,5-(2-methoxy-ethylcarboxy)-1,4-naphthalene dicarboxylic acid
2,5-[2(2-methoxyethoxy)-ethylcarboxy]-1,4-naphthalene dicarboxylic acid
5,8-[2(2-methoxyethoxy)-ethylcarboxy]-1,4-naphthalene dicarboxylic acid
2,4-di[2(2-methoxyethoxy)-ethylcarboxy]-1,5-naphthalene dicarboxylic acid
3,7-di(phenylcarboxy)-2,6-naphthalene dicarboxylic acid
4,10-di(4-methoxy-phenylcarboxy)-3,9-perylene dicarboxylic acid
1,8-di(2-methoxy-ethylcarboxy)-9,10-phenanthrene dicarboxylic acid
3,3'-di(benzylcarboxy)-2,2'-diphenyl dicarboxylic acid
3,3'-di(2[2(2-methoxy-ethoxy) ethoxy]-ethylcarboxy)-2,2' diphenyl dicarboxylic acid
3,3'-di(2-methoxy-ethylcarboxy)-4,4'-benzophenone dicarboxylic acid
3,4'-di(2-nitro-propylcarboxy)-3',4-benzophenone dicarboxylic acid
3,4'-di(2-phenoxy-ethylcarboxy)-3', 4-benzophenone dicarboxylic acid
4,4'-di(2-ethoxy-ethylcarboxy)-3,3'-benzophenone dicarboxylic acid
2-(N,N-dimethylamido-methylcarboxy)-2',3-benzophenone dicarboxylic acid
2,3'-di(3-methoxy-phenylcarboxy)-3,4'-benzophenone dicarboxylic acid
3,5-di(phenylcarboxy)-2,4-thiophene dicarboxylic acid
3,5-di(4-methoxyphenylcarboxy)-2,4-furan dicarboxylic acid
3,6-di-(phenylcarboxy)-2,5-pyridine dicarboxylic acid
3,6-di(2-methoxy-phenylcarboxy)-2,5-pyrazine dicarboxylic acid
3,3'-di(2-methoxy-ethylcarboxy)-4,4'-diphenyl sulfone dicarboxylic acid
3,3'-di(3-nitro-phenylcarboxy)-4,4'-diphenyl ether dicarboxylic acid
3,3'-di(phenylcarboxy)-4,4'-diphenyl methane dicarboxylic acid
3,4'-di(4-methoxy-phenylcarboxy)-diphenyl-1,1-ethane-3', 4 dicarboxylic acid
3,3'-di(3-methoxy-phenylcarboxy)-diphenyl-1,1-ethane-2,2' dicarboxylic acid
3,3'-di(phenylcarboxy)-diphenyl-2,2-propane-4,4' dicarboxylic acid, and
5,4'-di(-methoxyphenylcarboxy)-dinaphthylketone-4,5' dicarboxylic acid.

As can be seen from the listed compounds, R can be the residue of benzene, the residue of a multi-ring compound, such as naphthalene, perylene, phenanthrene, diphenyl or the residue of a six- or five-ring heterocyclic compound, such as pyrazine, thiophene, pyridine or furan or an aromatic residue Ar-R''-Ar in which Ar is the residue of benzene and R'' is, e.g., $-CO-$, $-CH_2-$, $-CH(CH_3)-$, $-C(CH_3)_2-$, $-O-$, or $-SO_2-$. Suitable inert solvents are those of the carboxylic amide type, such as dimethyl formamide, dimethyl acetamide or dimethyl sulfoxide, which are used either alone or in admixture with one another.

Diisocyanates used in accordance with the present invention are aliphatic or aromatic diisocyanates, which also may contain heteroatoms.
Preferably employed are
decamethylene-1,10-diisocyanate,
toluene-2,4-diisocyanate,
toluene-2,6-diisocyanate,
3,3'-dimethyldiphenyl-4,4'-diisocyanate,
3,3'-dichlordiphenyl-4,4'-diisocyanate,
diphenyl-4,4'-diisocyanate,
naphthalene-1,5-diisocyanate,
diphenylsulfone-4,4'-diisocyanate,
2,2-diphenylpropane-4,4'-diisocyanate,
diphenylmethane-4,4'-diisocyanate,
diphenylether-4'4-diisocyanate, and
hexamethylene-1,6-diisocyanate.
The diisocyanates may be used alone or in admixture with one another.

Suitable catalysts are those generally known to isocyanate chemistry, such as tertiary amines or metal salts, e.g. copper naphthenate, cobalt naphthenate or lead naphthenate, in quantities of about 0.1 to 2 percent by weight, calculated on the diisocynate employed.

The formation of the polyamides from the acid esters and the diisocyanates is performed by the reaction of the components, either in molar ratios, or with an excess of diisocyanate up to about 30 mole percent. The reaction is carried out in inert organic solvents at temperatures between 40° and 150°C, under anhydrous conditions. When using the above-mentioned catalysts, the reaction temperatures may be considerably lower, i.e., at about 0°C. The reaction involves a slight, easily controllable carbon dioxide evolution. It is not necessary to isolate the acid esters before their reaction. It is possible, and advantageous, to treat the reaction mixture obtained, upon reaction of the anhydrides with the hydroxy compounds, directly with the diisocyanates.

The viscous polyamide solutions may be processed especially by heat treatment into films or other shaped articles or coatings, for example, which have good mechanical properties and can be imidated by dehydrating reagents or by heating in the range of about 200° to 1,000° C to produce insoluble and thermally stable products.

The polyamides with equally good results may be isolated as a powder by precipitation and processed according to the usual sintering methods.

The products have excellent properties and are suitable for packaging and electrical application purposes or as thermo-insulating materials. The properties of the products may be modified in known manner by additional other polymers, plasticizers, fillers, and dyestuffs or pigments.

The advantages of the process of the present invention include easily obtained isocyanate compounds produced on a large scale, simplicity of performance since no delicate intermediate polymer products are necessary, and the recovery of pure polymers.

The invention will be further illustrated by reference to the following examples:

EXAMPLE 1

6.44 g (0.020 mole) of benzophenone tetracarboxylic acid-3,3'-4,4'-dianhydride, and 4.97 g (0.040 mole) of p-methoxy-phenol are dissolved in 60 g of anhydrous N,N-dimethylformamide and heated for 1 hour at 60°C and for an additional hour at 100°C in a heating bath. The resulting solution of a mixture of the isomers of bis-(p-methoxyphenylcarboxy)-benzophenone-dicarboxylic acid is then cooled to 60°C and 6.01 g (0.024 mole) of diphenylmethane-4,4'-diisocyanate are batchwise added during a period of 15 minutes. The solution is then stirred for 15 to 30 minutes. The solution has an RSV value of 1.14 and is cast on a glass support to produce a film. After drying under reduced pressure at 100°C, the polyamide film easily can be stripped. After further heating for two hours at 200° to 220°C, the polyamide film can be condensed to give a film having cyclic polyimide units. The film is then insoluble, has the typical yellow color of the polyimides and has the characteristic absorption thereof in the ultrared range (e.g. at 5.64μ). The RSV value is defined as $$\frac{\frac{viscosity\ of\ the\ solution}{viscosity\ of\ the\ solvent} - 1}{c}$$

c is the concentration of the polymer in grams/10 ml of solution. The RSV value is determined at 25°C in a 1 percent solution of a suitable solvent, e.g. m-cresol. The film had an elongation at break of 55 percent.

EXAMPLE 2

The ester formation is performed as described in Example 1. The solution of a mixture of the isomers of bis-(p-methoxyphenylcarboxy)-benzophenone-dicarboxylic acid is cooled to 0°C, 1 percent by weight (calculated on the total solids content) of 1,4-diazo-(2,2,2)-dicyclooctane is added as the catalyst, and 6.01 g (0.024 mole) of diphenylmethane-4,4'-diisocyanate are added within 15 minutes. The solution is then stirred for 4 hours at 0°C; its RSV value is then 1.37.

The film formation is performed on a glass support. After drying at room temperature and condensation at 220°C, a polyimide film is obtained. The film had an elongation at break of 54 percent.

EXAMPLE 3

3.75 g (0.0125 mole) of diphenyl-methane-4,4'-diisocyanate are added to 5.71 g (0.010 mole) of a mixture of the isomers of bis-(p-methoxy-phenylcarboxy)-benzophenonedicarboxylic acid and 0.15 g (0.0025 mole) is isophthalic acid, dissolved in 30 g of anhydrous N,N-dimethylformamide. The solution is stirred for 2 hours and then has an RSV value of 1.40.

Film formation, drying, and condensation are performed as described in Example 1. The film had an elongation at break of 58 percent.

EXAMPLE 4

As described in Example 1, 5.25 g (0.025 mole) of trimellitic anhydride and 3.10 g (0.025 mole) of p-methoxyphenol are reacted to give the corresponding acid ester. The solution is cooled and 7.50 g (0.030 mole) of diphenylmethane-4,4'-diisocyanate are then added batchwise. The solution is stirred for 1 hour; its RSV value is 1.00. Film formation, drying and condensation are performed as described in Example 1. The film had an elongation at break of 62 percent.

EXAMPLE 5

The procedure of Example 1 was repeated with the exception that instead of p-methoxy-phenol, phenol was used. The solution has an RSV value of 1,3, and an elongation at break of 7 percent.

EXAMPLE 6

The procedure of Example 4 was repeated with the exception that instead of p-methoxy-phenol, phenol was employed. The solution has an RSV value of 1.1, and an elongation at break of 5 percent.

It will be obvious to those skilled in the art that many modifications may be made within the scope of the present invention without departing from the spirit thereof, and the invention includes all such modifications.

What is claimed is:

1. In the process for the preparation of a polyamide by reacting an organic diisocyanate with a dicarboxylic acid in an organic solvent, the improvement which comprises improving the solubility of the dicarboxylic acid and the polyamide in the inert solvent by reacting at least one organic diisocyanate selected from the group consisting of
decamethylene-1,10-diisocyanate,
toluene-2,4-diisocyanate,
toluene-2,6-diisocyanate,
3,3'-dimethyldiphenyl-4,4'-diisocyanate,
3,3'-dichlorodiphenyl-4,4'-diisocyanate,
diphenyl-4,4'-diisocyanate,
naphthalene-1,5-diisocyanate,
diphenylsulfone-4,4'-diisocyanate,
2,2-diphenylpropane-4,4'-diisocyanate,
diphenylmethane-4,4'-diisocyanate,
diphenylether-4,4'-diisocyanate, and
hexamethylene-1,6-diisocyanate,
with at least one dicarboxylic acid selected from the group consisting of
-(4-methoxy-phenylcarboxy)-isophthalic acid
2,5-di(4-methoxy-phenylcarboxy)-terephthalic acid
2-(4-methoxy-phenylcarboxy)-terephthalic acid
2-(4-phenoxy-phenylcarboxy)-terephthalic acid
2-(2,4,6-trinitro-phenylcarboxy)-terephthalic acid
5-(4-N,N-dimethylamido-phenylcarboxy)-1,4-naphthalene dicarboxylic acid
4-(2-methoxy-phenylcarboxy)-1,5-naphthalene dicarboxylic acid
3-(3-methoxy-phenylcarboxy)-2,6-naphthalene dicarboxylic acid
2,5-(2-methoxy-ethylcarboxy)-1,4-naphthalene dicarboxylic acid
2,5-[2(2-methoxyethoxy)-ethylcarboxy]-1,4-naphthalene dicarboxylic acid
5,8-[2(2-methoxyethoxy)-ethylcarboxy]-1,4-naphthalene dicarboxylic acid
2,4-di2(2-methoxyethoxy)-ethylcarboxy -1,5-naphthalene dicarboxylic acid
4,10-di(4-methoxy-phenylcarboxy)-3,9-perylene dicarboxylic acid
1,8-di(2-methoxy-ethylcarboxy)-9,10-phenanthrene dicarboxylic acid
3,3'-di(2[2(2-methoxyethoxy)ethoxy]-ethylcarboxy)-2,2'-diphenyl dicarboxylic acid
3,3'-di(2-methoxy-ethylcarboxy)-4,4'-benzophenone dicarboxylic acid
3,4'-di(2-nitro-propylcarboxy)-3',4-benzophenone dicarboxylic acid
3,4'-di(2-phenoxy-ethylcarboxy)-3',4-benzophenone dicarboxylic acid
4,4'-di(2-ethoxy-ethylcarboxy)-3,3'-benzophenone dicarboxylic acid
2-(N,N-dimethylamido-methylcarboxy)2',3-benzophenone dicarboxylic acid
2,3'-di(3-methoxy-phenylcarboxy)-3,4'-benzophenone dicarboxylic acid
3,5-di(4-methoxy-phenylcarboxy)-2,4-furan dicarboxylic acid
3,6-di(2-methoxy-phenylcarboxy)-2,5-pyrazine dicarboxylic acid
3,3'-di(2-ethylcarboxy)-4,4'-diphenyl sulfone dicarboxylic acid
3,3'-di(3-nitro-phenylcarboxy)-4,4'-diphenyl ether dicarboxylic acid
3,4'-di(4-methoxy-phenylcarboxy)-diphenyl-1,1-ethane-3',4-dicarboxylic acid
3,3'-di(3-methoxy-phenylcarboxy)-dipheny-1,1-ethane-2,2'-dicarboxylic acid, and
5,4'-di(methoxy-phenylcarboxy)-dinaphthylketone-4,5' dicarboxylic acid.

2. A process according to claim 1 in which the polyamides are converted into shaped articles having no imide units at an elevated temperature in the range of about 20° to 200°C.

3. A process according to claim 1 in which the polyamides are converted into shaped articles having cyclic imide units at an elevated temperature in the range of about 200° to 1,000°C.

4. A process according to claim 1 in which the reaction is effected in the presence of a catalyst.

* * * * *

UNITED STATES PATENT OFFICE
CERTIFICATE OF CORRECTION

Patent No. 3,873,503                    Dated  March 25, 1975

Inventor(s) Klaus Hoheisel, Gisela Jenik, and Walter Seifried

It is certified that error appears in the above-identified patent and that said Letters Patent are hereby corrected as shown below:

Item [30] has been omitted and should read as follows:
- - - Foreign Application Priority Data
November 11, 1967   Germany .............. 17 45 053   - - -

Column 2, line 28, "carbom" should read - - - carbon - - -.  Line 48, after "to" insert - - - about - - -.

Column 7, line 17, at the beginning of the line, insert - - - 4 - - -.

Column 8, line 19, after "3,3'-di(2", insert - - -   -methoxy - - -.

Signed and sealed this 27th day of May 1975.

(SEAL)
Attest:

RUTH C. MASON
Attesting Officer

C. MARSHALL DANN
Commissioner of Patents
and Trademarks